United States Patent
Akhlaghi et al.

(10) Patent No.: US 12,091,587 B2
(45) Date of Patent: Sep. 17, 2024

(54) ONE-COMPONENT MOISTURE-CURABLE ADHESIVE COMPOSITION

(71) Applicant: Akzo Nobel Coatings International B.V., Amsterdam (NL)

(72) Inventors: Shahin Akhlaghi, Amsterdam (NL); Hendrica Petronella Maria Verlaan-Hooft, Amsterdam (NL)

(73) Assignee: Akzo Nobel Coatings International B.V., Amsterdam (NL)

( * ) Notice: Subject to any disclaimer, the term of this patent is extended or adjusted under 35 U.S.C. 154(b) by 0 days.

(21) Appl. No.: 18/577,455

(22) PCT Filed: Jul. 13, 2022

(86) PCT No.: PCT/EP2022/069663
§ 371 (c)(1),
(2) Date: Jan. 8, 2024

(87) PCT Pub. No.: WO2023/285561
PCT Pub. Date: Jan. 19, 2023

(65) Prior Publication Data
US 2024/0271024 A1    Aug. 15, 2024

(30) Foreign Application Priority Data

Jul. 13, 2021 (EP) .................... 21185300

(51) Int. Cl.
C09J 175/08 (2006.01)
B27G 11/00 (2006.01)
C09J 7/10 (2018.01)

(52) U.S. Cl.
CPC ............. *C09J 175/08* (2013.01); *B27G 11/00* (2013.01); *C09J 7/10* (2018.01); *C09J 2203/346* (2020.08); *C09J 2301/302* (2020.08); *C09J 2301/50* (2020.08); *C09J 2475/00* (2013.01)

(58) Field of Classification Search
CPC ...... C09J 175/08; C09J 7/10; C09J 2203/346; C09J 2301/302; C09J 2301/50; C09J 2475/00; B27G 11/00
See application file for complete search history.

(56) References Cited

U.S. PATENT DOCUMENTS

| 7,253,244 | B2 | 8/2007 | Gruenewaelder et al. |
| 10,662,276 | B2 | 5/2020 | Colson et al. |
| 2004/0259968 | A1 | 12/2004 | Krebs |
| 2005/0032972 | A1 | 2/2005 | Gruenewaelder et al. |
| 2005/0137377 | A1 | 6/2005 | Gruenewaelder et al. |
| 2006/0283548 | A1 | 12/2006 | Singh et al. |
| 2017/0321095 | A1 | 11/2017 | Pela et al. |
| 2021/0024795 | A1 | 1/2021 | Schmatloch et al. |

FOREIGN PATENT DOCUMENTS

| EP | 0244608 A1 | 11/1987 | |
| EP | 1072620 A2 * | 1/2001 | ............ C08G 18/12 |
| JP | 61141777 A | 12/1984 | |
| WO | 9919141 A1 | 4/1999 | |
| WO | 03016368 A1 | 2/2003 | |
| WO | 03055929 A1 | 7/2003 | |
| WO | 2016060977 A1 | 4/2016 | |
| WO | 2016196258 A1 | 12/2016 | |
| WO | 2017083380 A1 | 5/2017 | |
| WO | 2019081598 A1 | 5/2019 | |
| WO | 2020023696 A1 | 1/2020 | |
| WO | 2020201419 A1 | 10/2020 | |
| WO | 2021022470 A1 | 2/2021 | |

OTHER PUBLICATIONS

Sung et al., "Characteristics of Polyurethane Adhesives with Various Uretonimine Contents . . . ", J. Appl. Polym. Sci., DOI: 10.1002/APP.43737, Apr. 1, 2016. (Year: 2016).*
International Search Report and Written Opinion of Corresponding International Application No. PCT/EP2022/069663, mailed Oct. 17, 2022.
European Search Report of Corresponding EP Application No. 21185300.7, dated Jan. 20, 2022.
English Translation of EP0244608A1.
English Translation of EP1072620A2.
Derwent Abstract of JP61141777A.
English Translation of WO03016368A1.
English Translation of WO03055929A1.
English Translation of WO2020201419A1.
International Preliminary Report on Patentability of Corresponding International Application No. PCT/EP2022/069663, mailed Jun. 7, 2023.

* cited by examiner

*Primary Examiner* — Christopher W Raimund
(74) *Attorney, Agent, or Firm* — Pauly, DeVries Smith & Deffner LLC

(57) ABSTRACT

A one-component moisture-curing adhesive composition is provided, comprising from 80 to 100 wt % of an isocyanate-functional prepolymer obtainable by reacting (a) a polyisocyanates mixture having an average nominal isocyanate functionality in the range of from above 2.00 to below 2.05, and (b) a polyol mixture, wherein the equivalent ratio between isocyanate groups in (a) and hydroxyl groups in (b) is in the range of from 3.5 to 7.0, wherein the content of free isocyanate groups in the adhesive composition is in the range of from 14 to 17 wt %, and wherein polyisocyanates mixture (a) comprises (a1) a diisocyanate comprising methyl diphenyl diisocyanate in excess of (a2) a uretonimine-modified methyl diphenyl diisocyanate comprising at least 3 isocyanate functional groups. A method of bonding a first piece of material to a second piece of material using such adhesive composition, and an object made from the method, are also provided.

19 Claims, No Drawings

ONE-COMPONENT MOISTURE-CURABLE ADHESIVE COMPOSITION

CROSS-REFERENCE TO RELATED APPLICATIONS

This application is a 35 U.S.C. § 371 national phase application of PCT Application No. PCT/EP2022/069663 (published as WO 2023/285561 A1), filed on Jul. 13, 2022, which claims priority to EP Application No. 21185300.7, filed on Jul. 13, 2021, each of which is incorporated by reference herein in its entirety.

FIELD OF THE INVENTION

The present invention relates to a one-component moisture-curable adhesive composition comprising an isocyanate-functional prepolymer, to a method of bonding a first piece of material to a second piece of material using such adhesive composition and to an object comprising a first piece of material and a second piece of material bonded with such adhesive composition, in particular a structural wood product.

BACKGROUND OF THE INVENTION

Glued laminated timber, also called laminated timber beams, glue-laminated beams or glulam, is a structural timber product composed of several layers of dimensioned lumber glued together. By laminating several smaller pieces of wood, a single large, strong, structural member can be manufactured from smaller timbers, for example for use as ridge beams, garage door headers, floor beams, vertical columns, or horizontal beams, often in curved, arching shapes. Glued laminated beams are used in a wide range of applications in building construction. Another glued laminated wood product is cross-laminated timber (CLT), which is a wood panel product made by gluing layers of solid-sawn lumber together. Each layer of board is oriented perpendicular to adjacent layers and glued on the wide faces of each board, usually in a symmetric way so that the outer layers have the same orientation. Regular timber is an anisotropic material, meaning that the mechanical properties vary depending on the direction in which force is applied. By gluing layers of wood at perpendicular angles, the panel is able to achieve better structural rigidity in both directions. CLT is distinct to glued laminated timber, a product with all laminations oriented in the same way.

Adhesive compositions used in building materials such as glued laminated wood products and other structured wood products (also known as engineered wood products) need to meet stringent requirements with respect to adhesion strength under indoor and outdoor conditions. Exposure to moisture and thermal stress causes tension in the wood due to swelling and shrinkage and requires an adhesive that can provide superior bond strength even under such conditions.

One-component moisture-curing polyurethane adhesives are known for bonding pieces of wood to form structural wood products such as glued laminated wood products. Such adhesive compositions comprise an isocyanate-functional prepolymer that cures upon reacting with moisture. Isocyanate groups in the prepolymer react with water to form amine groups that react with further isocyanate groups to form urea bonds. When used for manufacturing glued structural wood products, the adhesive composition is typically applied on a surface of a piece of wood, such as timber or lumber, and then different pieces of wood are pressed together to cure the adhesive composition and form a structural wood product.

Such polyurethane adhesives are for example described in WO 99/19141, US 2005/032972, and WO 2021/022470.

In WO 99/19141 is described a polyisocyanate adhesive for use in lignocellulosic-based structural lamination manufacture (plywood manufacture). The adhesive comprises an isocyanate-containing prepolymer having an isocyanate content of 5 to 25% obtainable by reacting a polyol mixture with an average nominal functionality of from 2 to 4 and an average equivalent weight of from 500 to 3000, with a stoichiometric excess of methyl diphenyl diisocyanate. Polypropylene-polyethylene-oxide polyols with up to 5% of another polyol are mentioned as particularly preferred polyol mixtures.

In US 2005/032972 is described a fast setting one-pack polyurethane adhesive containing a polyisocyanate prepolymer and at least one aminoether polyol, having a molar ratio of ether groups to amino nitrogen in the aminopolyether polyol of 7 to 30. The polyurethane prepolymer is produced by reaction of polyisocyanates with compounds containing isocyanate-reactive functional groups.

In WO 2021/022470 is described a one-component polyurethane prepolymer composition for waterproofing coating applications. It comprises a reaction product of at least one polyisocyanate and a polyol blend comprising a bifunctional polyether polyol with a weight average molecular weight from 3,000 to 9,000 g/mol and a trifunctional polyether polyol end-capped with 10-28 wt % of ethylene oxide and a weight average molecular weight from 5,000 to 8,000 g/mol.

The balance between maximum assembly time (AT) and minimum pressing time (PT) is very important for one-component moisture-curing polyurethane adhesive compositions. Maximum assembly time is the time pieces of material with adhesive composition applied on it can be assembled before pressing. The applied adhesive composition still needs to be curable when the pieces are pressed together. Minimum pressing time is the time in the press needed to give enough bonding of the pressed pieces of material to allow further processing of the structural product. A ratio of AT to PT of 1:1 to 1:2.5 is often acceptable. Ideally, the AT/PT ratio is close to 1.1, preferably between 1:1 and 1:2, more preferably between 1:1 and 1:2. Adhesive compositions with a very good AT/PT ratio are typically poorer in mechanical properties such as wet and dry adhesion strength compared to products with a less favourable AT/PT ratio. Therefore, fibres are often added to one-component moisture-curing polyurethane adhesive compositions to improve mechanical properties such as longitudinal tensile strength.

There is a need in the art for one-component moisture-curing polyurethane adhesive compositions that combine a favourable AT/PT ratio with good mechanical properties even without fibres.

SUMMARY OF THE INVENTION

It has now been found that a one-component moisture-curable adhesive composition comprising an isocyanate-functional prepolymer provides good adhesion and has a favourable AT/PT ratio if the prepolymer is prepared by reacting excess polyisocyanates comprising methyl diphenyl diisocyanate and uretonimine-modified methyl diphenyl diisocyanate with a specific polyol mixture, and if the content of free isocyanate groups in the adhesive composition is in the range of from 14 to 17 wt %.

Accordingly, the present disclosure provides in a first aspect a one-component moisture-curing polyurethane adhesive composition comprising an isocyanate-functional prepolymer obtainable by reacting:
- (a) a polyisocyanates mixture having an average nominal isocyanate functionality in the range of from above 2.00 to below 2.05 comprising:
  - (a1) a diisocyanate comprising methyl diphenyl diisocyanate; and
  - (a2) a uretonimine-modified methyl diphenyl diisocyanate comprising at least 3 isocyanate functional groups; and
- (b) a polyol mixture comprising
  - (b1) a linear butylene oxide-based diol with two primary hydroxyl groups;
  - (b2) a polyether triol with three secondary hydroxyl groups; and
  - (b3) an amine-initiated polyether polyol;
- wherein the equivalent ratio between isocyanate groups in (a) and hydroxyl groups in (b) is in the range of from 3.5 to 7.0,
- wherein the content of free isocyanate groups in the adhesive composition is in the range of from 14 to 17 wt %.

Due to its excellent adhesion properties and its favourable AT/PT ratio, the one-component moisture-curing polyurethane adhesive composition according to the first aspect is particularly suitable for bonding pieces of material, in particular pieces of wood such as lumber or timber to form structural wood products.

Accordingly, in a second aspect, the present disclosure provides a method for bonding a first piece of material to a second piece of material, comprising contacting a surface of the first material with a surface of the second material, wherein at least one of the contacted surfaces has the adhesive composition according to the first aspect of the present disclosure applied to it prior to the contacting.

In a final aspect, the present disclosure provides an object comprising a first piece of material and a second piece of material bonded with the adhesive composition according to the second aspect of the present disclosure, in particular a structural wood product.

DETAILED DESCRIPTION OF THE INVENTION

The adhesive composition according to the present disclosure is a one-component, moisture-curable composition. It comprises an isocyanate-functional prepolymer, preferably in an amount of at least 80 wt %, more preferably at least 85 wt %, even more preferably at least 90 wt %. The adhesive composition may comprise the isocyanate-functional prepolymer in an amount up to 100 wt %, preferably up to 99.8 wt %.

The isocyanate-functional prepolymer is obtainable by reacting:
- (a) a polyisocyanates mixture having an average nominal isocyanate functionality in the range of from above 2.00 to below 2.05 comprising:
  - (a1) a diisocyanate comprising methyl diphenyl diisocyanate; and
  - (a2) an uretonimine-modified methyl diphenyl diisocyanate comprising at least 3 isocyanate functional groups; and
- (b) a polyol mixture comprising
  - (b1) a linear butylene oxide-based diol with two primary hydroxyl groups;
  - (b2) a polyether triol with three secondary hydroxyl groups; and
  - (b3) an amine-initiated polyol;
- wherein the equivalent ratio between isocyanate groups in (a) and hydroxyl groups in (b) is in the range of from 3.5 to 7.0.

Polyisocyanate mixture (a) comprises a diisocyanate (a1) comprising methyl diphenyl diisocyanate and a uretonimine-modified methyl diphenyl diisocyanate (a2) comprising at least 3 isocyanate functional groups. Polyisocyanate mixture (a) comprises diisocyanate (a1) in excess of uretonimine-modified methyl diphenyl diisocyanate (a2). The average nominal isocyanate functionality of polyisocyanates mixture (a) is in the range of from above 2.00 to below 2.05, preferably of from above 2.00 to 2.04, more preferably of from above 2.00 to below 2.03. Typically, the average nominal isocyanate functionality of polyisocyanates mixture (a) is above 2.001; preferably above 2.002; more preferably above 2.003; still more preferably above 2.004; most preferably above 2.005. Reference herein to the average nominal isocyanate functionality is to the number average of isocyanate groups per molecule.

Diisocyanate (a1) comprises methyl diphenyl diisocyanate (MDI). The methyl diphenyl diisocyanate may be 4,4'-methyl diphenyl diisocyanate, 2,4'-methyl diisocyanate, 2,2'-methyl diphenyl diisocyanate, or a mixture of two or more thereof. Preferably, diisocyanate (a1) consists of methyl diphenyl diisocyanate, more preferably consists of 4,4'-methyl diphenyl diisocyanate or of a mixture of 4,4'-methyl diphenyl diisocyanate and 2,4'-methyl diphenyl diisocyanate, and/or 2,2'-methyl diphenyl diisocyanate. Preferably the 4,4'-methyl diphenyl diisocyanate content of the polyisocyanate mixture (a) is in the range of from 50 to 100 wt %. Such mixtures are commercially available, for example as Suprasec 2004, Suprasec 6004 (ex. Huntsman), Lupranate MX 119/1 (ex. BASF), Cosmonate JG-50K, Cosmonate PI (ex. Kumho Mitsui Chemicals), or Ongronat CO4050 (ex. Wanhua).

For the purpose of this specification, the term methyl diphenyl diisocyanate refers to methyl diphenyl diisocyanate as such and does not include polymeric, oligomeric, or modified methyl diphenyl diisocyanate, such as for example carbodiimide-, uretonimine-, or isocyanurate-modified methyl diphenyl diisocyanate.

Uretonimine-modified methyl diphenyl diisocyanate (a2) comprises at least 3 isocyanate functional groups, preferably in the range of from 3 to 10 isocyanate functional groups, more preferably in the range of from 3 to 6 isocyanate functional groups, even more preferably 3 or 4 isocyanate functional groups.

Polyisocyanate mixture (a) may comprise polyisocyanate other than methyl diphenyl diisocyanate or uretonimine-modified methyl diphenyl diisocyanate, preferably in an amount up to 25 wt % of the total weight of polyisocyanates (a), more preferably up to 10 wt %. In a particularly preferred embodiment, the polyisocyanate mixture (a) consists of methyl diphenyl diisocyanate and uretonimine-modified methyl diphenyl diisocyanate and is free of any other polyisocyanate.

Polyol mixture (b) comprises a linear butylene oxide-based diol with two primary hydroxyl groups (b1), a polyether triol with three secondary hydroxyl groups (b2) and an amine-initiated polyol (b3).

Butylene oxide-based diol (b1) is linear and has two primary hydroxyl groups. The two primary hydroxyl groups are terminal hydroxyl groups. Such diols can be obtained by polymerizing butylene oxide, also known as tetrahydrofuran, and are also known as poly(tetrahydrofuran), poly(tetramethylene ether)glycol, poly(tetramethylene oxide), or poly(1,4-butanediol). Preferably, diol (b1) has a number average molecular weight in the range of from 500 to 2,500 g/mol, more preferably of from 500 to 1,500 g/mol. Such diols (b1) are commercially available, for example as PolyTHF 650, PolyTHF 1000, PolyTHF 1400 (ex. BASF).

Polyether triol (b2) has three secondary hydroxyl groups. Polyether triol (b2) preferably is a polyethylene ether, a polypropylene ether, a polybutylene ether, or a hybrid thereof, more preferably a polyethylene ether, a polypropylene ether or a hybrid thereof. Preferably, polyether triol (b2) has a number average molecular weight in the range of from 500 to 2,500 g/mol, more preferably of from 500 to 1,500 g/mol. An example of a particularly suitable polyether triol (b2) is Voranol CP1050 (commercially available from Dow), a polypropylene ether triol with a number average molecular weight of 1,000 g/mol.

Amine-initiated polyether polyol (b3) is a polyol prepared by using an amine as an initiator molecule, preferably an aliphatic amine. Suitable amine initiator molecules include ethylene diamine hexamethylene diamine, methyl amine, isopropanolamine, diisopropanolamine, ethanolamine, diethanolamine, N-methyl diethanolamine, tetrahydroxyethyl ethylenediamine, or mixtures thereof. The amine initiator preferably contains 1 to 18 carbon atoms, more preferably 1 to 6 carbon atoms. The amine-initiated polyether polyol (b3) is a polyether, preferably a poly(ethylene oxide), a poly(propylene oxide) or a hybrid thereof. Amine-initiated polyether polyol (b3) preferably contains 2 to 6 hydroxyl groups, more preferably 2 to 4 hydroxyl groups, even more preferably 3 or 4 hydroxyl groups. The number average molecular weight of amine-initiated polyether polyol (b3) is preferably in the range of from 1,000 to 10,000 g/mol, more preferably of from 1,000 to 6,000 g/mol, even more preferably of from 1,500 to 5,000 g/mol. Preferably, at least part of the hydroxyl groups are primary hydroxyl groups. Primary hydroxyl groups may be obtained by end-capping the polyether chains with ethylene oxide. Such amine-initiated polyether polyols are commercially available, for example Lupranol 1002/1 (ex. BASF).

Typically, the amount of butylene oxide-based diol (b1) in polyol mixture (b) is such that in the range of from 45 to 85% of the hydroxyl groups in polyol mixture (b) are hydroxyl groups from butylene oxide-based diol (b1), preferably in the range of from 50 to 80%, more preferably from 55 to 75%, most preferably from 60 to 70%. It has been found that a content of hydroxyl groups from butylene oxide-based diol (b1) in polyol mixture (b) in the range of from 55 to 75% improves the AT/PT ratio compared to lower contents.

Typically, the amount of polyether triol (b2) in polyol mixture (b) is such that in the range of 20 to 70% of the hydroxyl groups in polyol mixture (b) are hydroxyl groups from polyether triol (b2), preferably, from 30 to 60%, more preferably from 35 to 55%.

Polyol mixture (b) may comprise polyols other than butylene oxide-based diol (b1) and polyether triol (b2), preferably in an amount less than 50 wt % of polyol mixture (b), more preferably less than 30 wt %, even more preferably less than 10 wt %. In a particularly preferred embodiment, polyol mixture (b) is substantially free of any polyols other than (b1) and (b2). Reference herein to substantially free of any polyols other than (b1) and (b2) is to the polyol mixture comprising at most 1 wt % of any polyols other than (b1) and (b2), preferably at most 0.5 wt %, even more preferably to a polyol mixture free of any polyols other than (b1) and (b2).

Preferably, the amount of amine-initiated polyether polyol (b3) in polyol mixture (b) is such that the number of hydroxyl groups from amine-initiated polyether polyol (b3) is at most 50%, preferably at most 40%, even more preferably at most 20%, still more preferably at most 15% of the total number of hydroxyl groups in polyol mixture (b). The amount of butylene oxide-based diol (b1) in polyol mixture (b) is preferably such that the number of hydroxyl groups from butylene oxide-based diol (b1) is at least 40% of the total number of hydroxyl groups in polyol mixture (b).

The isocyanate-functional prepolymer is obtainable by reacting excess polyisocyanate with polyols. The equivalent ratio of isocyanate groups in the polyisocyanate mixture (a) and hydroxyl groups in polyol mixture (b) is in the range of from 3.5 to 7.0, preferably in the range of from 4.0 to 6.5, more preferably of from 4.5 to 6.0. A larger excess of polyisocyanate might result in a lower molecular weight of the resulting prepolymer, which might negatively affect bonding strength and AT/PT ratio.

Preferably, the isocyanate-functional prepolymer has a weight average molecular weight of at least 1,500 g/mol, more preferably of at least 2,000 g/mole. A weight average molecular weight in the range of from 2,000 to 5,000 g/mol is particularly preferred.

Reaction conditions for preparing isocyanate-functional prepolymer from polyisocyanate and polyol are well-known in the art. Any suitable reaction conditions may be used.

Reference herein to number average molecular weight or weight average molecular weight is to the number average molecular weight or the weight average molecular weight as determined by size-exclusion chromatography using polystyrene standards. A suitable determination method is ISO 16014-1.

The adhesive composition may comprise components other than the isocyanate-functional prepolymer, such as for example organic solvent, reactive diluent, curing catalyst, pigments, fillers, and one or more additives, such as defoaming agents and thickeners.

The adhesive composition may comprise organic solvent, preferably in an amount of at most 10 wt % of the total weight of the adhesive composition, more preferably at most 5 wt %, even more preferably at most 2 wt %. If an organic solvent is present, the organic solvent preferably is a polar organic solvent such as for example a ketone, an ester, or an ether.

The adhesive composition may comprise a curing catalyst for curing the moisture-curing reaction, typically in an amount in the range of from 0 to 0.4 wt %. Suitable curing catalysts are known in the art. Tertiary amines, organometallic compounds, and strong bases, are known to be suitable as curing catalyst. A particularly preferred curing catalyst is 2,2'-dimorpholinediethylether (DMDEE).

The adhesive composition may comprise any suitable additive commonly used in adhesion compositions, such as for example defoaming agents, thickeners, and/or wetting agents. Preferably, the adhesive composition comprises a defoaming agent and/or a thickener.

The adhesive composition has a content of free isocyanate groups in the range of from 14 to 17 wt %, based on the total weight of the adhesive composition. Free isocyanate groups are free isocyanate groups in the prepolymer and any unreacted polyisocyanate monomers. Further polyisocyanate, preferably a diisocyanate, more preferably methyl diphenyl diisocyanate, may be added to the prepolymer to arrive at a content of free isocyanate groups in the adhesive composition in the range of from 14 to 17 wt %.

More preferably, the adhesive composition has a content of free isocyanate groups in the range of from 15.0 to 16.5 wt %.

The content of free isocyanate groups is determined according to ASTM D2572-19.

The adhesive composition preferably contains no or only trace amounts of water. Preferably, the adhesive composition contains less than 1.0 wt %, more preferably less than 0.2 wt %, even more preferably less than 0.01 wt % of water, based on the total weight of the adhesive composition. Water is not explicitly added, e.g. to adjust the viscosity of the coating composition, but merely present, if at all, in trace amounts as part of typical adhesive additives.

The adhesive composition is preferably free of fibres.

In a preferred embodiment, the adhesive composition is free of any compounds other than the isocyanate-functional prepolymer, additional polyisocyanate, curing catalyst, and additives.

The one-component moisture-curable adhesive composition is particularly suitable for bonding pieces of wood or other materials to form structural products.

The present disclosure therefore provides a method of bonding a first piece of material to a second piece of material, comprising contacting a surface of the first material with a surface of the second material, wherein at least one of the contacted surfaces has the adhesive composition according to the first aspect of the present disclosure applied to it prior to the contacting.

In a third aspect, the present disclosure provides an object comprising a first piece of material and a second piece of material bonded with the adhesive composition according to the first aspect of the present disclosure.

The material may be any suitable material such as wood, metal, plastic, paper, glass, concrete, gypsum or other mineral material such as stone or brick. The first and the second pieces of material may be different materials. Preferably, the pieces of material are pieces of wood.

The object may be any suitable object. Preferably the material is wood, and the object is a structural wood product.

The invention is further illustrated by means of the following non-limiting examples.

EXAMPLES

The polyisocyanates and polyols used in the examples are given in Table 1.

TABLE 1

Polyisocyanates and polyols used

| Commercial name | Description |
|---|---|
| Suprasec 2004 (ex. Huntsman) | Mixture of 4,4-MDI, 2,4-MDI and 2,2-MDI; nominal isocyanate functionality 2.0 |
| Suprasec 2020 (ex. Huntsman) | Mixture of MDI and uretonimine-modified MDI with 3 NCO groups; average nominal isocyanate functionality 2.1 |
| PolyTHF 1000 (ex. BASF) | Poly(tetrahydrofuran); Mn is 1,000 g/mol |
| Voranol CP1050 (ex. Dow) | Glycerine initiated propoxylated polyether homopolymer triol; nominal hydroxyl functionality 3. Secondary hydroxyl groups. Mn is 1,078 g/mol. |
| Lupranol 1002/1 (ex. BASF) | Alkoxylate on the basis of an aliphatic amine. It contains primary hydroxyl end groups. Molecular weight is about 3,700 g/mol. |
| Lupranol 2095 (ex. BASF) | Trifunctional polyether polyol; contains primary hydroxyl groups |

Preparation of Isocyanate-Functional Prepolymer

Polyisocyanates and polyols were added to a three-neck reactor equipped with a mechanical stirrer and a cooler, under a nitrogen blanket. The amounts and type as indicated in Table 2. The reactor content was mixed and when the exothermal reaction was completed (no further rise of temperature) the reactor was heated to a temperature of 50° C. and maintained at this temperature until all polyol was reacted (until the content of free isocyanate as measured according to ASTM D2572-19 was equal to the isocyanate content that could theoretically be achieved). This was typically after 1.5 to 2 hours. The reactor was then cooled to room temperature and the resulting prepolymer was collected from the reactor. The molecular weight and the free isocyanate content of the prepolymer thus prepared were determined.

Preparation of Adhesive Compositions

Adhesive compositions were prepared by adding 0.2 wt % curing catalyst (Jeffcat DMDEE), 0.05 wt % defoaming agent (Foamaster MO 2115) and 0.8 wt % thickener (Carbosil TS 720) to the prepolymer. Methyl diphenyl diisocyanate (Suprasec 2004) was added until a content of free isocyanate groups between 14.5 and 16.5 wt % based on the total weight of the adhesive composition was achieved.

Test Methods

Longitudinal Tensile Shear Strength

With each adhesive composition, assemblies of beech panels were prepared according to EN302-1:2013 with a thick glue line (0.5 mm gap-joint). The amount of adhesive composition applied was in excess (double-sided application). The time between glue-up and testing was 13 days (at 65% relative humidity and 20° C.).

The assembly time was approximately 4 min, the pressing time was 16 hours and the applied pressure was 8.0 kg/cm$^2$.

The longitudinal tensile shear strength of bonded assemblies with thick glue lines was determined after treatment A4 as described in EN302-1: 2013: A4: Soaking in boiling water for 6 hours, following by soaking in cold water (20° C.) for 2 hours. The samples were tested in the wet state.

Closed Assembly Time (AT)

Closed assembly time of the adhesive compositions was determined according to EN14080:2013.

With each adhesive composition, assemblies were prepared by gluing together five lamellas of spruce, with the dimensions of 285×145×30 mm. The amount of adhesive composition applied was 120 g/m2. The lamellas were assembled into a stack directly after the application of the adhesive composition. After different time intervals (assembly times), the assemblies were pressed for 16 hours. The applied pressure was 8.0 kg/cm$^2$.

After 5 days at 20° C. and 65% relative humidity, delamination of the glue line was determined according to Annex C of EN14080:2013, using method B.

Closed assembly time is the longest assembly time that can be applied without exceeding the delamination value in Table 9 of EN14080:2013.

Minimum Pressing Time (PT)

The minimum pressing time of the adhesive compositions was determined was determined according to EN14080: 2013.

With each adhesive composition, assemblies were prepared by gluing together five lamellas of spruce, with the dimensions of 285×145×30 mm. The amount of adhesive composition applied was 120 g/m$^2$. After 2 minutes assembly time, the assemblies were pressed with an applied pressure of 8 kg/cm$^2$. The press times were varied.

After 5 days at 20° C. and 65% relative humidity, delamination of the glue line was determined according to Annex C of EN14080:2013, using method B.

Minimum pressing time is the minimum pressing time needed without exceeding the delamination value in Table 9 of EN14080:2013.

The longitudinal tensile shear strength, AT and PT are shown in Table 2.

TABLE 2

Prepolymers and adhesive compositions: ingredients and properties

| | 1 | | 2* | | 3* | | 4* | | 5* | | 6* | | 7* | |
|---|---|---|---|---|---|---|---|---|---|---|---|---|---|---|
| | wt % | eq.$^a$ | wt % | eq.$^a$ | wt % | eq.$^a$ | wt % | eq.$^a$ | wt % | eq.$^a$ | wt % | eq.$^a$ | wt % | eq.$^a$ |
| Polyisocyanate mixture (a) | | | | | | | | | | | | | | |
| Suprasec 2004 | 47 | 4.0 | 39 | 4.3 | 26 | 2.85 | 55 | 5.0 | 51 | 5.0 | 46 | 4.0 | 47 | 5.0 |
| Suprasec 2020 | 12 | 1.0 | 14 | 1.4 | 26 | 2.85 | — | — | — | — | 11 | 1.0 | — | — |
| Polyol mixture (b) | | | | | | | | | | | | | | |
| PolyTHF 1000 | 21 | 0.45 | 21 | 0.6 | 20 | 0.6 | 25 | 0.5 | 23 | 0.5 | 25 | 0.5 | 22 | 0.6 |
| Voranol CP1050 | 12 | 0.45 | | | | | 16 | 0.4 | 13 | 0.4 | 18 | 0.5 | | |
| Lupranol 1002/1 | 8 | 0.10 | 26 | 0.4 | 28 | 0.4 | 4 | 0.1 | — | — | — | — | 31 | 0.4 |
| Lupranol 2095 | | | | | | | | | 13 | 0.1 | | | | |
| Total wt % | 100 | | 100 | | 100 | | 100 | | 100 | | 100 | | 100 | |
| Mn (g/mol) | 509 | | | | | | 419 | | | | 455 | | | |
| Mw (g/mol) | 3211 | | | | | | 2848 | | | | 2792 | | | |
| NCO content prepolymer (wt %) | 15.2 | | | | | | 15.0 | | | | 15.4 | | 12.8 | |
| NCO content adhesive composition (wt %) | 16.1 | | 14.5 | | 15 | | 15.8 | | 15.6 | | 16 | | 15.8 | |
| AT/PT | 1:1.6 | | 1:2.7 | | 1:1 | | 1:2 | | 1:2.5 | | 1:2.5 | | 1:1.5 | |
| AT (minutes) | 5 | | 3 | | 10 | | 5 | | 8 | | 5 | | 10 | |
| PT (minutes) | 8 | | 8 | | 10 | | 10 | | 20 | | 12.5 | | 15 | |
| Shear strength (MPa) | 5.34 | | 5.27 | | 2.61 | | 4.66 | | 4.9 | | 5.69 | | 2.6 | |

*comparison examples
$^a$equivalents NCO or OH
AT: closed assembly time
PT: minimum pressing time The examples show that an adhesive composition with a prepolymer prepared by reacting a polyisocyanate comprising uretonimine-modified MDI and a polyol mixture comprising poly(tetrahydrofuran), a triol with secondary hydroxyl groups and an amine-initiated polyether diol has a very good AT/PT ratio (between 1:1 and 1:2) and provides bonds with very good shear strength.

The invention claimed is:

1. A one-component moisture-curing adhesive composition comprising from 80 to 100 wt % of an isocyanate-functional prepolymer obtainable by reacting:
    (a) a polyisocyanates mixture having an average nominal isocyanate functionality in the range of from above 2.00 to below 2.05 comprising:
        (a1) a diisocyanate comprising methyl diphenyl diisocyanate; and
        (a2) a uretonimine-modified methyl diphenyl diisocyanate comprising at least 3 isocyanate functional groups; and
    (b) a polyol mixture comprising:
        (b1) a linear butylene oxide-based diol with two primary hydroxyl groups;
        (b2) a polyether triol with three secondary hydroxyl groups; and
        (b3) an amine-initiated polyether polyol;
    wherein the equivalent ratio between isocyanate groups in (a) and hydroxyl groups in (b) is in the range of from 3.5 to 7.0,
    wherein the content of free isocyanate groups in the adhesive composition is in the range of from 14 to 17 wt % determined according to ASTM D2572-19, and
    wherein polyisocyanates mixture (a) comprises diisocyanate (a1) in excess of uretonimine-modified methyl diphenyl diisocyanate (a2).

2. A one-component moisture-curing adhesive composition according to claim 1, wherein butylene oxide-based diol (b1) has a number average molecular weight in the range of from 500 to 1,500 g/mol determined by size-exclusion chromatography using polystyrene standards according to ISO 16014-1.

3. A one-component moisture-curing adhesive composition according to claim 1, wherein polyether triol (b2) has a number average molecular weight in the range of from 500 to 1,500 g/mol determined by size-exclusion chromatography using polystyrene standards according to ISO 16014-1.

4. A one-component moisture-curing adhesive composition according to claim 1, wherein the polyol mixture (b) is substantially free of any polyols other than (b1), (b2) and (b3).

5. A one-component moisture-curing adhesive composition according to claim 1, wherein the equivalent ratio between isocyanate groups in (a) and hydroxyl groups in (b) is in the range of from 4.0 to 6.5.

6. A one-component moisture-curing adhesive composition according to claim 1, wherein the content of free isocyanate groups in the adhesive composition is in the range of from 15.0 to 16.5 wt % determined according to ASTM D2572-19.

7. A one-component moisture-curing adhesive composition according to claim 1, wherein the diisocyanate (a1) is methyl diphenyl diisocyanate.

8. A one-component moisture-curing adhesive composition according to claim 7, wherein polyisocyanate mixture (a) essentially consists of methyl diphenyl diisocyanate and a uretonimine-modified methyl diphenyl diisocyanate.

9. A one-component moisture-curing adhesive composition according to claim 1, wherein the uretonimine-modified diisocyanate (a2) comprises in the range of from 3 to 10 isocyanate functional groups.

10. A one-component moisture-curing adhesive composition according to claim 1 comprising from 85 to 99.8 wt % of the prepolymer.

11. A one-component moisture-curing adhesive composition according to claim 1, further comprising a curing catalyst.

12. A one-component moisture-curing adhesive composition according to claim 1, further comprising one or more additives.

13. A method of bonding a first piece of material to a second piece of material, comprising contacting a surface of the first material with a surface of the second material, wherein at least one of the contacted surfaces has the adhesive composition according to claim 1 applied to it prior to the contacting.

14. An object comprising a first piece of material and a second piece of material bonded with the adhesive composition according to claim 1.

15. An object according to claim 14, wherein the first piece of material is wood, the second piece of material is wood and the object is a structural wood product.

16. A one-component moisture-curing adhesive composition according to claim 1, wherein the equivalent ratio between isocyanate groups in (a) and hydroxyl groups in (b) is in the range of from 4.5 to 6.0.

17. A one-component moisture-curing adhesive composition according to claim 1, wherein the uretonimine-modified diisocyanate (a2) comprises in the range of from 3 to 6 isocyanate functional groups.

18. A one-component moisture-curing adhesive composition according to claim 1, wherein the uretonimine-modified diisocyanate (a2) comprises in the range of from 3 to 4 isocyanate functional groups.

19. A one-component moisture-curing adhesive composition according to claim 1, further comprising 2,2'-dimorpholinediethylether.

* * * * *